Feb. 18, 1947. H. P. BOTTS 2,416,149
ATTACHMENT FOR COFFEE POTS
Filed Aug. 20, 1943

INVENTOR
HUGH P. BOTTS
BY
ATTORNEY

Patented Feb. 18, 1947

2,416,149

UNITED STATES PATENT OFFICE 2,416,149

ATTACHMENT FOR COFFEE POTS

Hugh P. Botts, New York, N. Y., assignor of one-fourth to Lawrence G. Botts, New York, N. Y.

Application August 20, 1943, Serial No. 499,361

7 Claims. (Cl. 99—292)

1

This invention relates to receptacles used for the preparation of coffee and particularly such receptacles as commonly referred to as the "Silex" type of coffee pot. More particularly, the invention relates to an attachment for use in connection with the upper or brewing vessel of coffee preparing devices of the kind mentioned forming a cover for said vessel, a holder or support for the vessel when in inverted position, as well as a receptacle for receiving the grounds when the vessel is in inverted position. Still further, the attachment provides a means for simplifying the operation of cleaning the vessel in removing the grounds therefrom and in finally disposing of the grounds.

The novel features of the invention will be best understood from the following description, when taken together with the accompanying drawing, in which certain embodiments of the invention are disclosed, and in which the separate parts are designated by suitable reference characters in each of the views, and in which.

Figure 1:
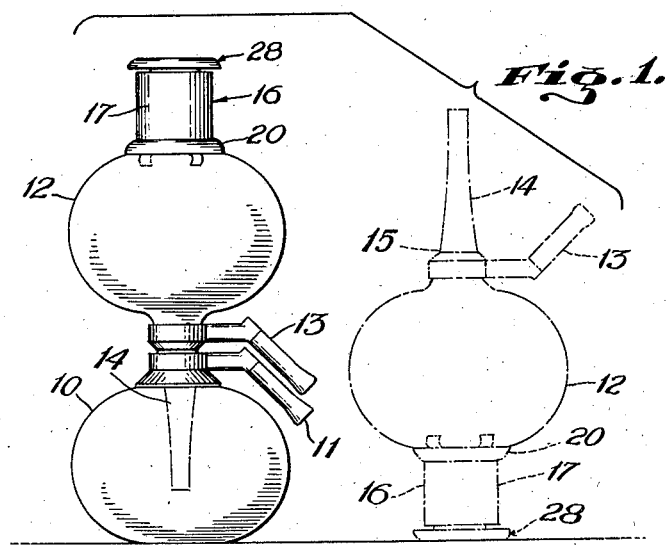
Fig. 1 is a diagrammatic view showing a coffee pot of the type and kind under consideration in normal brewing position in full lines and with the brewing vessel removed and in inverted position in dot and dash lines in illustrating the use of my attachment.

In Fig. 1 of the drawing, I have illustrated at 10 the bottom part of a coffee pot or device of the general type and kind, commonly referred to as a "Silex." This bottom portion includes a handle member 11 facilitating the discharge of the coffee, when prepared, from the pot 10 and after the upper brewing part or vessel 12 has been removed, as is indicated in dot and dash lines in said figure. The vessel 12 includes at its neck portion a handle member 13 facilitating attachment and detachment thereof, as well as other handling of the vessel, and projecting from the neck is the conventional spout or tube 14, which extends into the vessel 10. The other details of construction of the device are not dealt with, as they form no particular part of the invention and it is commonly known that in apparatus of this kind, strainer devices are arranged in the neck portion 15 of the part 12, which retain the coffee grounds at all times within the vessel 12.

At 16, I have illustrated one of my attachments.

2

Figure 4:
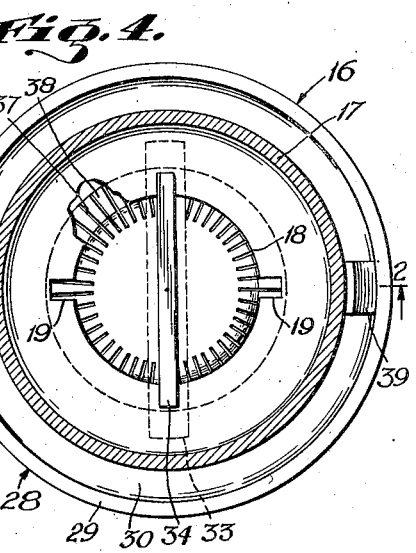
Fig. 4 is a section on the line 4—4 of Fig. 2.

The attachment comprises a substantially cup-shaped casing 17, the bottom wall of which has a large opening 18, which is further enlarged by notches 19 arranged on opposed walls thereof, as will clearly appear in Fig. 4 of the drawing. The upper end of the casing 17 has an outwardly and upwardly extending flange portion 20, which forms an annular recess 21, in which is preferably arranged a packing-ring or gasket 22.

Opposed walls of the casing 17, near the flanged end 20 thereof, have recesses 23 for the reception of springs 24, having projecting, curved or rounded ends 25, which are adapted to enter the opening 26 in the top of the receptacle 12 and to firmly engage the walls of the receptacle in supporting the attachment 16 thereon. The spring-plates 24 are retained against displacement by rivets or other fastenings, as indicated at 27. However, the contour of the plates will conform with the recesses or sockets 23, this keying the plates against any shifting movement on the container 17.

Figure 3:
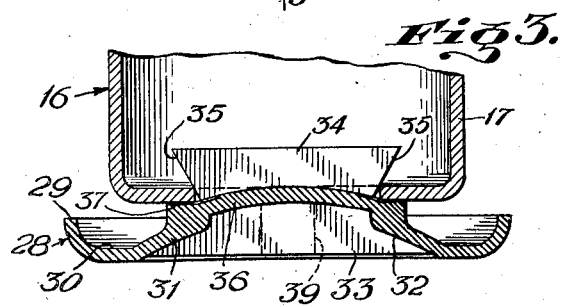
Fig. 3 is a section on the line 3—3 of Fig. 2.

A cap 28 is detachably coupled with the casing 17 and this cap comprises a saucer-like body having an upwardly extending peripheral flange 29, which forms a shallow receptacle 30 to catch any drainage from the coffee grounds, when the device is in the inverted position, as is shown in dot and dash lines in Fig. 1. The central portion of the cap 28 is domed, as seen at 31, which provides a recess 32 in the bottom of the cap. Transversing this recess is a bar 33, which forms a finger-piece facilitating attachment and detachment of the cap. On the top of the dome is a corresponding bar or rib 34, which terminates in bevelled end walls 35, note Fig. 3, and these walls engage the bottom of the container 17, in retaining the cap against displacement from the container. It is understood, however, that the greatest width of the rib 35 is such as to freely pass through the notches 19, in attaching and detaching the cap. When the cap is attached, the bar 34 is moved into a position at right angles to the notches 19, as is clearly illustrated in Fig. 4 of the drawing.

Figure 2:
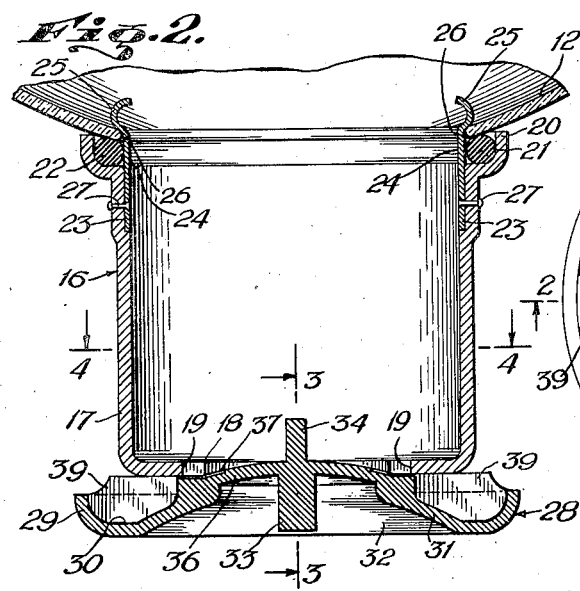
Fig. 2 is an enlarged sectional view through the attachment illustrating the same mounted on the open end of the vessel.

The central portion of the dome 31 is offset, as seen at 36, and on the periphery of this offset is formed circumferentially spaced ribs or knurlings 37, which are disposed at the periphery of the opening 18 in the bottom of the container 17, so as to form a drainage from the container. In other words, the cap 28 forms what might be termed a strainer, which will allow the passage of fluid through the bottom of the container, but will retard or retain the grounds within the container, except possibly for some very fine grains, which might find their way through the small openings or passages 38, which will be formed between the ribs or knurlings 37. Arranged in the receptacle 30 and on opposed walls of the cap 28 are seat blocks 39, upon which the bottom of the container 17 rests, as will clearly appear in Fig. 2 of the drawing.

In the use of the attachment, the device is mounted on the top of the receptacle 12 after the grounds have been placed in the receptacle and the required fluid arranged in the lower receptacle 10, preparatory to making coffee. By reason of the packing 22, it will be apparent that in the preparation of the greatest capacity or number of cups of the apparatus, in the event of a bubbling over or excessive agitation of the brewing in the vessel 12, the attachment will form a supplemental extension chamber, in which this excessive bubbling or brewing can take place without any loss of the fluid. While this excessive bubbling should not be permitted, often times, by oversight, it occurs and as a result, a loss of the fluid is experienced. It will be understood that the cap provides the necessary ventilation through the passages 38 to properly vent the top vessel 12.

After the brewing is over and the coffee has been transmitted from the vessel 12 into the vessel 10 and nothing but grounds remain in the vessel 12, this vessel is then, as usual, removed from the vessel 10 and, by reason of the attachment 16, can be placed in the inverted position, illustrated in dot and dash lines in Fig. 1 of the drawing with the cap 28 resting on a suitable support. In this position, most of the grounds are permitted to fall and collect in the casing 17. Some fluid, which may still prevail in the grounds, can drain off and be collected in the receptacle 30 of the cap and thus prevent it from passing onto the surface of the support on which the inverted receptacle is arranged.

When it comes time for cleaning the receptacle 12, if some of the grounds still remain adjacent the neck of the receptacle, the entire unit, as appearing in dot and dash lines in Fig. 1, may be placed under a faucet allowing the water to pass through the tube 14 into the receptacle 12 to thoroughly flush out and clean out this receptacle in removing the grounds. Thereafter, the attachment 16 is removed from the receptacle 12 and the grounds may then be conveniently disposed of and this operation performed without any destruction or injury to the receptacle 12, which is usually composed of glass. In this connection, it will be understood that the attachment 16 in its entirety and with the possible exception of the spring clips and packing 22 will be composed of plastic material.

The cap 28 may readily be detached from the casing 17 in cleaning out the attachment preparatory for the next use and all parts are freely accessible for a thorough cleaning, as will be readily understood.

From the foregoing, it will be apparent that in addition to providing an attachment which forms a practical base and support for the receptacle 12 when in inverted position, I also provide an attachment which, in the preparation of coffee, performs a useful and practical function. Still further, in dispensing of the coffee grounds and to avoid the more or less conventional practice of allowing the grounds to pass through the drainpipes of a sink, the arrangement of the grounds in the receptacle facilitates disposal of the grounds in a garbage can or other means of disposal.

For purposes of description, the coffee maker may be said to comprise a dispensing part, which would be the bottom receptacle 10 and a brewing part, which would be the top receptacle 12.

The attachment is detachable with respect to the brewing part and forms therefor an extended or overflow chamber, a receptacle for receiving the coffee grounds, a means for draining the coffee grounds in eliminating more of the moisture therefrom and a base for supporting the brewing part in inverted position.

Having fully described my invention, what I claim as new and desire to secure by Letters Patent is:

1. An attachment for the grounds receiving receptacle of a coffee making device, said receptacle having an upper, open end, said attachment comprising a casing open at opposite ends, means comprising resilient members at one end of the casing for detachably coupling the same with the upper end of the receptacle, a saucer-like cap detachably coupled with the other end of the casing and forming a supporting base for said attachment when the attachment is in inverted position, and means comprising a grooved central raised portion on said cap forming a drain between said cap and end of the casing.

2. An attachment for the grounds receiving receptacle of a coffee making device, said receptacle having an upper, open end, said attachment comprising a casing open at opposite ends, means comprising resilient members at one end of the casing for detachably coupling the same with the upper end of the receptacle, a saucer-like cap detachably coupled with the other end of the casing and forming a supporting base for said attachment when the attachment is in inverted position, means comprising a grooved central raised portion on said cap forming a drain between said cap and end of the casing, and said last named means and said casing having means detachably coupling the cap with said casing.

3. An attachment for the grounds receiving receptacle of a coffee making device, said receptacle having an upper, open end, said attachment comprising a casing open at opposite ends, means comprising resilient members at one end of the casing for detachably coupling the same with the upper end of the receptacle, a saucer-like cap detachably coupled with the other end of the casing and forming a supporting base for said attachment when the attachment is in inverted position, means comprising a grooved central raised portion on said cap forming a drain between said cap and end of the casing, said last named means and said casing having means detachably coupling the cap with said casing, said raised portion forming a recess in the lower surface of the cap, and a bar traversing said recess and forming a finger grip for coupling and uncoupling the cap with said casing.

4. The combination with a two receptacle coffee making device having an upper coffee brewing receptacle with a large opening at the top thereof, of an attachment comprising a casing having at one end thereof an opening of substantially the same size as the opening in said receptacle, means resiliently and detachably coupling said casing with the top of said upper receptacle, the other end of the casing having a smaller opening, means detachably coupled with said last named end of the casing and extending beyond the periphery of said casing forming a supporting base for said casing and receptacle when in inverted position, said last named means and the casing adjacent the smaller opening having abutting surfaces, and means on one of said abutting surfaces forming passages through which liquid can pass while passage of solid particles therethrough is prevented.

5. The combination with a two receptacle coffee making device having an upper coffee brewing receptacle with a large opening at the top thereof, of an attachment comprising a casing having at one end thereof an opening of substantially the same size as the opening in said receptacle, means resiliently and detachably coupling said casing with the top of said upper receptacle, the other end of the casing having a smaller opening, a cap detachably coupled with said last named end of the casing and extending beyond the periphery of said casing, said cap forming a supporting base for said casing and receptacle, when in inverted position, said cap having a central raised portion, said raised portion having a circumferential surface knurled to form grooves therein, the casing adjacent the smaller opening being adapted to seat on said knurled surface forming fluid passages between the cap and casing, and said casing and the raised portion of the cap having means detachably coupling the cap with the casing.

6. The combination with a two receptacle coffee making device having an upper coffee brewing receptacle with a large opening at the top thereof, of an attachment comprising a casing having at one end thereof an opening of substantially the same size as the opening in said receptacle, means resiliently and detachably coupling said casing with the top of said upper receptacle, the other end of the casing having a smaller opening, a cap detachably coupled with said last named end of the casing and extending beyond the periphery of said casing, said cap forming a supporting base for said casing and receptacle, when in inverted position, said cap having a central raised portion, said raised portion having a circumferential surface knurled to form grooves therein, the casing adjacent the smaller opening being adapted to seat on said knurled surface forming fluid passages between the cap and casing, said casing and the raised portion of the cap having means detachably coupling the cap with the casing, the raised portion of the cap forming a recess in the lower surface of the cap, and a finger bar disposed within said recess.

7. The combination with a two receptacle coffee making device having an upper coffee brewing receptacle with a large opening at the top thereof, of an attachment comprising a casing having at one end thereof an opening of substantially the same size as the opening in said receptacle, means resiliently and detachably coupling said casing with the top of said upper receptacle, the other end of the casing having a smaller opening, means detachably coupled with said last named end of the casing and extending beyond the periphery of said casing forming a supporting base for said casing and receptacle when in inverted position, said last named means and the casing adjacent the smaller opening having abutting surfaces, means on one of said abutting surfaces forming passages through which liquid can pass while passage of solid particles therethrough is prevented, said first named means comprising circumferentially spaced spring fingers on the casing, and a sealing gasket supported on the casing adjacent said fingers.

HUGH P. BOTTS.

REFERENCES CITED

The following references are of record in the file of this patent:

UNITED STATES PATENTS

| Number | Name | Date |
|---|---|---|
| 1,978,074 | Bogoslowsky | Oct. 23, 1934 |
| 1,160,011 | Swing | Nov. 9, 1915 |
| 1,010,582 | Caley | Dec. 5, 1911 |
| 2,263,881 | Kors | Nov. 25, 1941 |
| 1,546,434 | Catalano | July 21, 1925 |
| 2,138,198 | Weber | Nov. 29, 1938 |
| 2,234,397 | Bentz | Mar. 11, 1941 |
| 136,703 | Childs | Mar. 11, 1873 |
| 727,597 | Day | May 12, 1903 |
| 1,834,516 | Dains | Dec. 1, 1931 |
| 2,030,344 | Young | Feb. 11, 1936 |
| 1,406,814 | Baker | Feb. 14, 1922 |
| 1,498,288 | Pascente | June 17, 1924 |
| 1,977,366 | Wolcott | Oct. 16, 1934 |
| 2,175,440 | Masin | Oct. 10, 1939 |
| 930,938 | Clement | Aug. 10, 1909 |
| 1,634,705 | Bridges | July 5, 1927 |
| 2,093,316 | Fowler | Sept. 14, 1937 |

FOREIGN PATENTS

| Number | Country | Date |
|---|---|---|
| 1,367 | British | 1892 |